May 17, 1960 — S. C. ROBINSON — 2,937,228
COAXIAL CABLE SPLICE
Filed Dec. 29, 1958
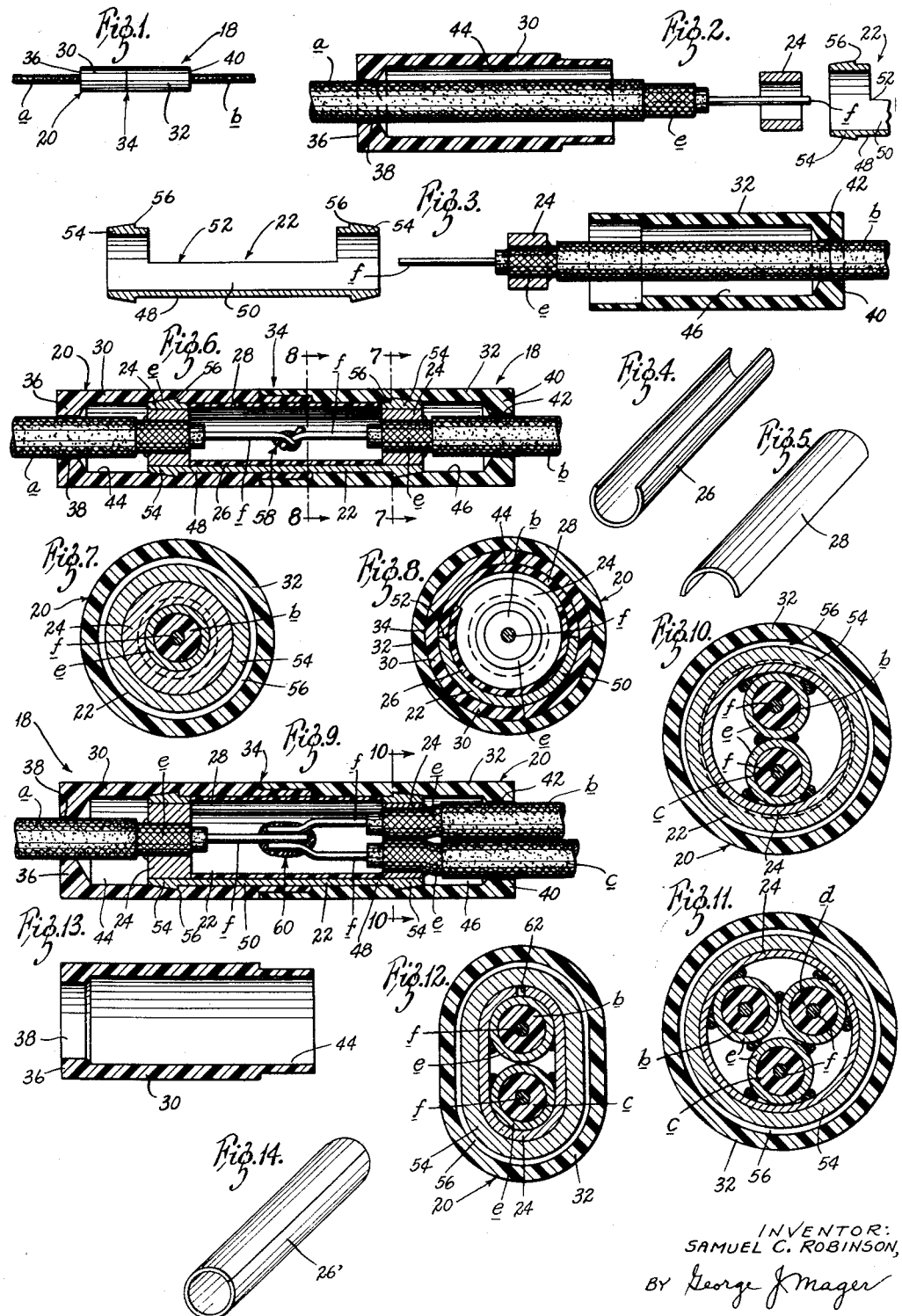
INVENTOR:
SAMUEL C. ROBINSON,
BY George J. Mager
HIS ATTORNEY

United States Patent Office 2,937,228
Patented May 17, 1960

2,937,228

COAXIAL CABLE SPLICE

Samuel C. Robinson, New Albany, Ind., assignor to Robinson Machine Works, Inc., New Albany, Ind., a corporation of Indiana Application December 29, 1958, Serial No. 783,356

2 Claims. (Cl. 174—88)

The present invention relates to means for connecting coaxial cables, and more particularly to a novel splice assembly adapted to effectively join two or more coaxial cables in simple fashion.

Primarily though not exclusively, the present invention is concerned with means for splicing coaxial cables of the miniature type that are extensively employed in electronic equipment.

Of necessity, cables of this type are small in diameter and the splicing of them has heretofore presented problems which the present invention is designed to solve. Thus for example, coaxial cables in the electronics field may have a diameter as small as one-sixteenth of an inch for 50 ohms cables, as small as three thirty-seconds of an inch for 70 ohm cables, and as small as one-eighth of an inch for 90 ohm cables.

Obviously, taking into consideration the minute size of such cables, splicings of them have heretofore constituted tedious and time-consuming operations even when effecting the simplest splices, that is cable to cable splices. The splicing of two or more cables to a single cable heretofore presented an even more tedious and difficult problem, and similarly, the splicing of two cables to two other cables. Insofar as I am aware, two methods have heretofore been employed to effect such splicings.

In critical circuits, where such factors as impedance, capacitance, voltages and so on must be taken into consideration, the splicing of cables has usually been accomplished by means of connectors. Such connectors have many disadvantages, not the least of which is that the resultant splice is bulky relatively to the space available therefor. This bulkiness stems from the fact that coaxial cable connectors are generally not insulated on the outside, and the application of insulative material thereto obviously increases the size of them. Furthermore, the proper application of the insulative material requires great care and frequently amounts to a tedious operation. Again, these connectors are comprised of many parts that require too much time in order to effect a splicing of cables, particularly when the ends of more than two cables are involved. In non-critical circuits, splices are usually made by soldering the cable ends together, and thereupon applying layers of insulative tape thereover. Such splices however are not moisture proof, are not shielded, and thus generally result in inferior connections.

The primary object of the present invention is to provide a novel splice adapted to overcome these and other disadvantages heretofore inherent in miniature cable splices.

It is a further object of the present invention to provide a splice that may be assembled easily, and is adaptable for use in critical as well as non-critical circuits.

Another object of this invention is to provide a coaxial cable splice that incorporates fewer parts than connectors currently employed, and that when assembled, occupies less space than splices made by means of such connectors, and splices made by the soldering and taping method.

A very important further object of the invention is to provide a splice including means for protecting the primary circuit from moisture, and means for insuring shield continuity.

In its basic embodiment, the present invention comprises an assemblage of but seven elements, two of which are designed for telescopic mating to provide a protective covering or jacket for the other five elements that are disposed therewithin, as will appear. The elements interiorly of the jacket include a shell or shield connector, a pair of solder rings, and a pair of insulators. In some cases, a single insulator may be substituted for the pair of insulators.

It is a feature of this invention that it is adaptable to various sizes of miniature cables, and to various combinations of such cables to be spliced, without changing the basic characteristics of any of its elements, as will be more fully explained below.

The invention is illustrated on a sheet of drawings that accompanies this specification, and a more comprehensive understanding of the advantages attainable by the employment thereof may be had from the detailed description that follows with reference to these drawings. It will be understood that whenever employed hereinafter, the terms "left," "right," "upper," and "lower" refer to parts as they appear in the drawings, and have been adopted in the interest of descriptive clarity only.

In the drawings:

Figure 1 is an actual size elevational view of a miniature coaxial cable to cable splice embodiment of the present invention;

Figure 2 is a vertical sectional view on an enlarged scale, illustrating splicing steps with respect to the end portion of the Figure 1 coaxial cable leading from the left;

Figure 3 is a view similar to Figure 2 illustrating splicing steps with respect to the end portion of an identical coaxial cable leading from the right;

Figure 4 is an enlarged isometric view of a first or lower insulator element included in the complete splice assembly;

Figure 5 is an enlarged isometric view of a second or upper insulator element included in the complete splice assembly;

Figure 6 is an enlarged axial sectional view of the complete splice assembly;

Figure 7 is a further enlarged transverse sectional view taken on the line 7—7 of Figure 6;

Figure 8 is a similar view taken on the line 8—8 of Figure 6, and particularly illustrating the cooperative disposition of the Figure 4 and Figure 5 insulator elements within the splice;

Figure 9 is a view similar to Figure 6, illustrating a completed splice with respect to a single coaxial cable leading from the left, and a pair of coaxial cables leading from the right;

Figure 10 is an enlarged transverse sectional view taken on the line 10—10 of Figure 9;

Figure 11 is a view similar to Figure 10, illustrating a three cable arrangement;

Figure 12 is a view similar to Figure 10 illustrating contour modifications;

Figure 13 is an axial sectional view of a male section of the jacket that would be employed in a pair to pair type of coaxial cable splice; and Figure 14 is an isometric view, similar to Figure 4, illustrating an exemplary insulator element modification.

An exemplary completed splice incorporating the concepts of the present invention is generally designated 18 in Figures 1, 6, and 9. In Figures 1 and 6, the splice 18 is illustrated with respect to one end of a coaxial cable a leading from the left, and one end of a coaxial cable b leading from the right. In Figure 9, the splice 18 is illustrated with respect to one end of a coaxial cable a leading from the left, and the ends of a pair of coaxial cables b and c leading from the right.

The splice 18 includes an enclosing jacket generally designated 20, a shield connector generally designated 22, a pair of solder rings 24, a first or lower insulator element 26, and a second or upper insulator element 28.

The illustrated jacket 20 is cylindrical, and is comprised of a male section 30 adapted to mate with a female section 32 in telescopic fashion as indicated at 34. The male section 30 is provided with an end wall portion 36, and formed centrally therein is a circular opening 38 of a size adapted to accommodate passage therethrough of the cable a. Similarly, the female section 32 is provided with an end wall portion 40, and formed centrally therein is a circular opening 42 of a size adapted to accommodate passage therethrough of the cable b.

It will be understood of course, that the sizes of the openings 38 and 42 are dependent on the size and quantity of the cables to be spliced. Thus for example in the splice illustrated in Figure 9, the opening 42 of the section 32 has a larger diameter, being of a size adapted to accommodate passage therethrough of the two cables b and c.

The jacket sections 30 and 32 are of molded plastic material, preferably Teflon, and prior to their incorporation in the splice 18, the inner peripheries 44 and 46 respectively of said sections are cylindrical from end to end, as illustrated in Figures 2 and 3.

The shield connector 22 comprises a generally tubular shell 48 of conductive material, preferably brass. The central portion 50 of the body thereof is recessed as indicated at 52 in Figure 3, so that said central portion is of semicircular contour as seen to best advantage in Figure 8. As will appear, the recess or opening 52 is provided to facilitate the splicing operation. The extremities 54 of the shield connector 22 are tapered slightly outwardly as shown, and are provided with annular barbed ridges 56 for a reason to be explained.

The solder rings 24 have external peripheries adapted to snugly engage the internal peripheries of the extremities 54 of the shield connector, and as will be seen have internal peripheries adapted to snugly engage the external peripheries of the cable shield portions. These rings are of conductive material, preferably brass, and as a comparison of Figures 6 and 9 will clarify, the internal diameters of said rings will vary in accordance with the size and quantity of the cables to be spliced.

As illustrated in Figure 4, the insulator 26 comprises a tubular body from which an end to end segment of approximately 120 degrees has been removed, so that said body in cross-section extends through approximately 240 degrees, as should be apparent. The insulator 26 is composed of thin plastic material, preferably Teflon, and its length corresponds to that of the recess 52 provided in the shield connector 22.

The insulator 28 as best seen in Figure 5, comprises a half tubular and thus semicircular body, formed on a radius slightly exceeding that whereon the insulator 26 is formed. The insulator 28 is likewise composed of thin plastic material, preferably Teflon, and its length also corresponds to that of the shield connector recess 52.

Although the manner of assembling the splice 18 shown in Figures 1 and 6 is believed apparent from an inspection of Figures 2 and 3, a brief explanation will be given.

The first step in the assembly operation would consist of stripping the ends of the cables a and b as shown, particular care being taken not to damage the conductive electrostatic shield portions e or the central conductors f. Next the jacket section 30 would be slid onto the cable a via the opening 38, and the jacket section 32 would be slid onto the cable b via the opening 42, with the mating ends of said sections facing one another.

Thereupon a ring 24 would be slipped on and soldered to the exposed shield portion e of each cable, followed by the insertion of each ring into one of the extremities 54 of the connector shield 22 in such fashion that the inner faces of the rings will lie flush with the adjacent edge that defines the recess 52. The next step would consist of twisting and soldering the ends of the conductors f together as suggested at 58 in Figure 6, access being had via the recess 52.

At this point it is to be noted that the conductor ends may optionally be twisted and soldered together, or as suggested at 60 in Figure 9, they may be disposed contiguously and surrounded by solder, particularly when three or more conductor ends are involved.

After the conductor ends had been soldered and a continuity test had been made, the lower insulator 26 would be inserted and positioned, whereupon the upper insulator 28 would be positioned to completely close the recess 52, as clearly illustrated in Figure 8.

Lastly, the jacket sections 30 and 32 would be brought into mated relationship over the thus far described assembly, the tapered extremities 54 of the shield connector facilitating this operation. Following completion of the mating operation, the entire assembly would be manually squeezed thus causing the barbed ridges 56 to "dig" into the inner peripheries 44 and 46 of the jacket sections, as suggested in Figure 6. It is noted however, that even though no external pressure were applied, the ridges would resist any tendency of the jacket sections 30 and 32 to separate.

From the foregoing it should be apparent that the present invention provides a coaxial cable splice that is compact, neat, and effective. As hereinbefore observed, Figure 1 is an actual size drawing of a complete cable to cable splice. Wherefore it will be understood that the internal components 22, 24, 26 and 28 thereof are minute, and would be accurately formed.

It should also be apparent that the invention is adaptable to splicing various combinations of coaxial cables without increasing the number of its parts. Thus, the exemplary one to two cable splice arrangement illustrated in Figure 9, requires that the opening 42 in the jacket section 32 have a larger diameter than its counterpart appearing in Figure 6, and that the solder ring 24 surrounding the shield portions e of the cables b and c likewise have a larger diameter (particularly internally), than its counterpart appearing in Figure 6.

In said Figure 9 arrangement, the shield portions e of the cables b and c may first be soldered to one another as suggested in Figure 10, whereupon the ring 24 may be applied. It will be understood of course, that the proper application of solder to the rings and shields is an important step in assembling the splices, but precise placement of solder is not critical so long as the outer peripheral surfaces of the rings are kept free thereof.

Figure 11 is a view similar to Figure 10 illustrating an adaptation of the present invention to a splice wherein a single cable a is assumed to be joined to three cables b, c, and d.

Preferably as thus far indicated, the jackets and parts of the invention enclosed therein are of a generally circular cross-sectional configuration. Figure 12 illustrates an adaption wherein the jackets and parts of the invention enclosed therein are of generally oval cross-sectional configuration. This view further suggests that the rings 24 may have a slit 62 therein to facilitate mounting them.

Assuming that instead of the one to two cable splice appearing in Figure 9, it were desired to join a pair of cables a to the illustrated cables b and c, the male jacket section 30 shown in Figure 13 would be substituted for its counterpart shown in said figure. The resulting splice would otherwise be similar to that of Figure 9, except that four central conductor ends *f* would be soldered together at 60, as should be apparent without requiring specific illustration.

Clearly therefore, the present invention is adaptable to various types and sizes of coaxial cables, and to the splicings of a wide range of cable combinations without the addition of elements over and above those shown and described. It should also be manifest that the splice assembling procedure may be varied somewhat from that explained with respect to Figure 6.

Illustrated in Figure 14, is an insulator element 26' that may when feasible, be substituted for the complemental insulator elements 26 and 28 presented in Figures 4 and 5. The insulator 26' is made of plastic tubing, preferably Teflon, and is provided with an end to end slit as shown, wherefore it may be spread to clear the soldered conductors and inserted into the shield connector 22. Being resilient, said insulator thereupon would revert to its original form, thus constituting a substitute for the two insulators 26 and 28.

In contemplation particularly of the description directed to Figure 11 through 14, it should be apparent that the elements included in the present invention may be modified to accommodate various cable sizes and cable combinations without changing their basic characteristics, and without increasing the number thereof, except perhaps when an unusual splice is required.

Wherefore it will be understood that the present invention contemplates any and all modifications thereof that may fall within the purview of the claims hereunto appended.

What I claim is:

1. In a splice for coaxial cables of the type described, in combination: a pair of solder rings rigid with the exposed shield portions of two or more cables; a shell member connecting the solder rings and maintaining them in definite spaced relation relatively to one another; a taper on each extremity of the shell, said taper terminating in an annular barbed ridge; a recess in the shell member providing access to the exposed ends of the central conductors of said cables for the application of solder thereto; at least one insulator element inserted in the shell member to surround the conductor ends after the solder has been applied thereto, and to simultaneously cover said access recess; and a jacket of non-conductive material comprising male and female sections slidably supported on the adjacent portions of said cables, said sections having telescoping portions and being adapted when in mated disposition to envelop the other elements set forth, said annular barbed ridges serving to prevent fortuitous separation of the jacket sections following the mating thereof.

2. In a splice of the character described, in combination: a jacket of plastic material including a male and a female section each having an end wall provided with a central circular opening for the passage therethrough of the free end portion of one of a pair of coaxial cables, said sections being slidable on said cable end portions and each having a telescopic portion opposite the end wall thereof whereby in consequence of sliding said sections toward one another they may be brought into mated relationship; a pair of rings each surrounding an exposed portion of the current conductive electrostatic shield of one of said cables and being soldered thereto, said rings being formed of conductive metallic material; a shell member of conductive metallic material connecting said rings and mantaining them in spaced relation relatively to one another, said shell member comprising a generally tubular body having a semicircular central portion merging at each end into a circular extremity disposed in intimate contact about one of said rings, said semicircular body portion providing an access opening facilitating the integration of the center conductors of said cables, each of said extremities having a slightly outwardly tapered external peripheral portion the inner end thereof being defined by an annular barbed ridge; a lower insulator element comprising a tubular body of this plastic material having an end to end segment of approximately 120 degrees removed therefrom disposed in the semicircular body portion of the shell member; and an upper insulator element comprising a semicircular body of thin plastic material covering the access opening in the body portion of the shell member with the longitudinal marginal edges thereof overlapping those of the lower insulator element; said insulator elements being of identical length but the upper one being formed on a slightly larger radius than that whereon the lower one is formed, said tapered external peripheral portions of the shell extremities serving to facilitate the mating of the jacket sections, said annular barbed ridges serving to engage in the inner peripheral surfaces of the mated jacket sections whereby to resist any tendency of them to separate.

References Cited in the file of this patent

UNITED STATES PATENTS

| | | |
|---|---|---|
| 323,964 | Rogers | Aug. 11, 1885 |
| 653,033 | McIntire | July 3, 1900 |
| 2,133,448 | Harley | Oct. 18, 1938 |
| 2,408,253 | Diebold | Sept. 24, 1946 |
| 2,478,082 | Broske | Aug. 2, 1949 |
| 2,536,003 | Du Pre | Dec. 26, 1950 |
| 2,782,391 | Kirk | Feb. 19, 1957 |

FOREIGN PATENTS

| | | |
|---|---|---|
| 693,371 | Great Britain | July 1, 1953 |